United States Patent [19]
Krynicki

[11] 3,747,858
[45] July 24, 1973

[54] IRRIGATION SYSTEM WITH PULSATING FLOW

[76] Inventor: Witold Krynicki, 321 Le Roy Ave., Arcadia, Calif. 91006

[22] Filed: Dec. 18, 1970

[21] Appl. No.: 99,598

[52] U.S. Cl................ 239/99, 239/101, 239/204, 239/381, 239/570
[51] Int. Cl............................................. B05b 1/08
[58] Field of Search................ 239/97, 99, 101, 239/204, 381, 570

[56] References Cited
UNITED STATES PATENTS

| | | | |
|---|---|---|---|
| 1,855,647 | 4/1932 | Pottenger, Jr. | 239/101 X |
| 1,999,804 | 4/1935 | De Loria | 239/101 X |
| 2,075,589 | 3/1937 | Munz | 239/204 X |
| 2,560,662 | 7/1951 | Rieger | 239/97 X |
| 3,021,078 | 2/1962 | Nickell | 239/204 X |
| 3,362,641 | 1/1968 | Barnes | 239/97 |
| 3,567,125 | 3/1971 | Houghton | 239/204 |

Primary Examiner—M. Henson Wood, Jr.
Assistant Examiner—Reinhold W. Thieme

[57] ABSTRACT

An irrigation system is disclosed wherein a widespread and highly dispersed spray is obtained by periodic variations in output pressure; an integral impeller means is driven by the flow of the input water to control valve means which cyclically varies the pressure in each of a plurality of stationary outlets.

1 Claim, 7 Drawing Figures

PATENTED JUL 24 1973 3,747,858

WITOLD KRYNICKI
INVENTOR

WITOLD KRYNICKI
INVENTOR

IRRIGATION SYSTEM WITH PULSATING FLOW

The invention relates in general to irrigation systems and specifically to a novel method of evenly distributing a highly dispersed spray of water over a wide area.

Present systems are generally along one of the following principles: a plurality of nozzles delivering a fixed irrigation pattern; mechanically rotated or oscillated nozzle delivering a generally narrow stream of water in an angular sweep; and various nozzle designs to provide a more or less dispersed jet of water. Most of these systems suffer from one or more of the following shortcomings: a great quantity of water falls over a limited areas of concentration; mechanically rotated units are cumbersome and expensive; and most improvements in nozzle design aimed at increasing the distribution also result in a reduction in reach of each nozzle necessitating the duplication of units and consequently an increase in cost.

It is therefore the object of this invention to provide an irrigation system affording a wide coverage and highly dispersed water spray with a compact and economical unit.

Reference is made to the drawings in which.

Figure 1:
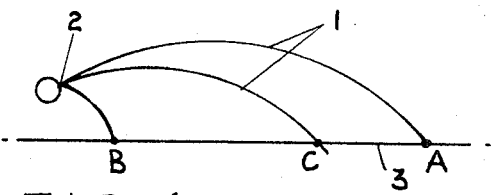
FIG. 1 is a diagramatic representation of the water pattern obtained with the instant invention.
Figure 2:
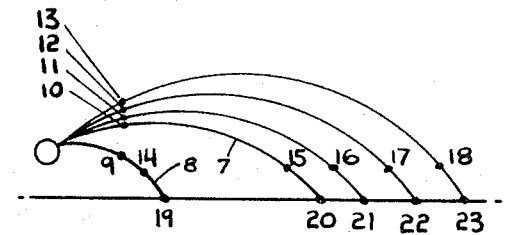
FIG. 2 is further diagram showing the distribution of water droplets across said pattern shown in FIG. 1.
Figure 4:
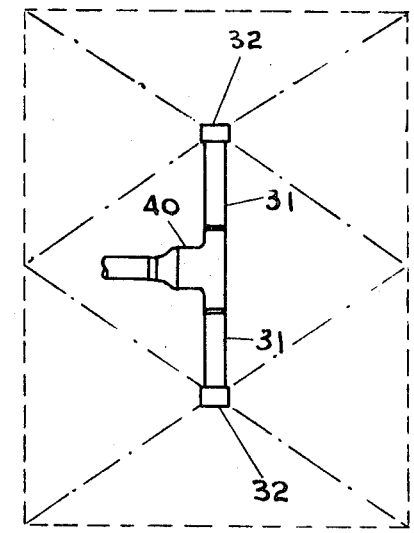
FIG. 4 is a sectional view of a preferred form of valve used in instant invention.

The basic principle is shown in FIG. 1 where a jet of water issuing from an orifice 2 will impact the ground 3 at a certain distance A, B, or C away from the orifice depending on the pressure of the water across the orifice. At the highest pressure the water jet will reach a distance A and conversely at the lowest pressure said jet will only reach a distance B. Any distance C, between A and B will be reached at the corresponding intermediate pressures. The function of the control valve shown in FIG. 4 is to vary the pressure in the orifice periodically from maximum to minimum so that the water is thrown from distance B to the maximum distance A and back, over and over again. With increasing oscillating speeds the cycle becomes much faster than the speed of the water travelling through the air resulting in a multiplicity of layers of droplets similar to a rainfall. This can be shown with reference to FIG. 2 wherein a random selection of trajectories are shown, these correspond to several pressures through the orifice. The instant during which the jet is in a particular trajectory can be represented by the corresponding droplets 9,10,11,12 and 13. Each droplet travels along the trajectory as shown by positions 14,15,16,17 and 18, until they reach the impact area 19,20,21,22 and 23. As those droplets travel along the trajectories a new droplet is formed immediately behind it by the successive pressure changes, and therefore the trajectories will be occupied by a large number of droplets.

Figure 3:
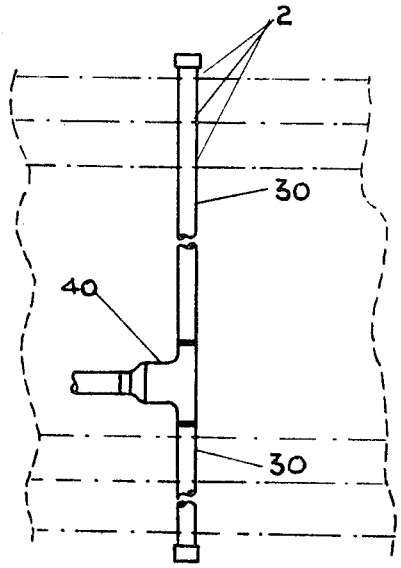
FIG. 3 is a top view of the valve system shown in FIG. 4.

FIGS. 3 and 4 show the valve controlling the rapid change of pressure in the orifice and comprises a housing 40 with an inlet port 41 and outlet ports 42 and 43, a rotating valve body 44 comprising a number of valve members 45. As the valve body is rotating around pivots 46 and 47, the output ports 42 and 43 are continuously changing from a totally open to a totally closed condition as will be evident from the drawing. The rotational movement of said valve body 44 is obtained by the flow of the water itself in the inlet port 41 acting against the impeller type structure 48 on the lower part of said valve body 44. The speed of the valve body is determined by the angle of the blades of the impeller and the velocity of the water supply.

The valve body and output ports are so structured that when one output port is fully open the other one is fully closed, so that a steady flow of water is maintained in the supply line, and avoid unwanted vibrations therein. Similarly in FIGS. 5 and 6 where four output ports are shown, two opposing ports are fully open and the other two are fully closed.

Figure 6:
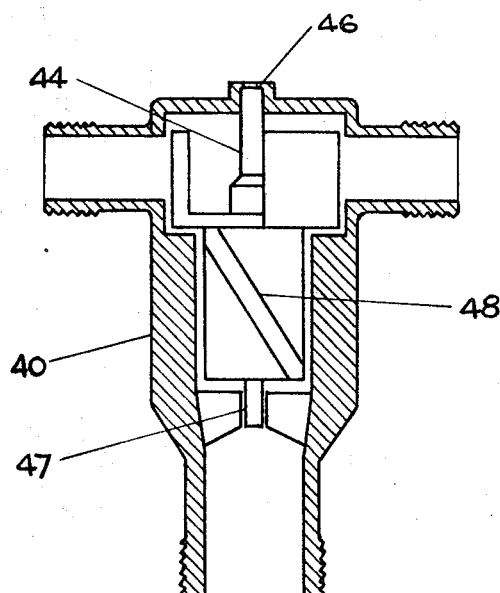
FIG. 6 is a fragmentary view of a modification of the embodiment shown in FIG. 7.
Figure 7:
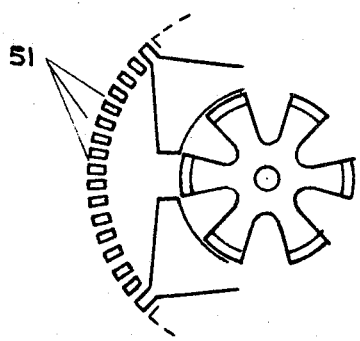
FIG. 7 is an embodiment of the instant invention.
Figure 8:
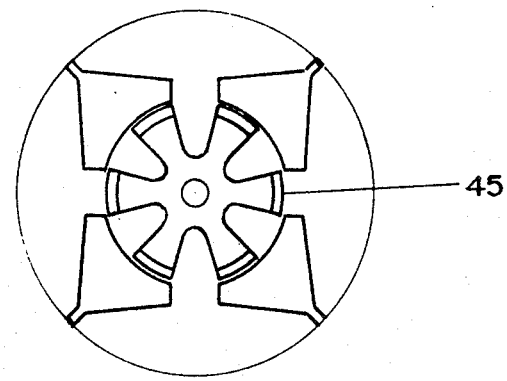
Figure 10:
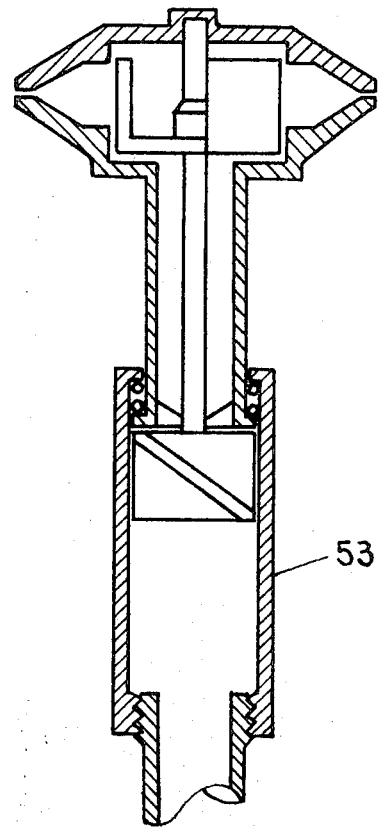
Figure 9:
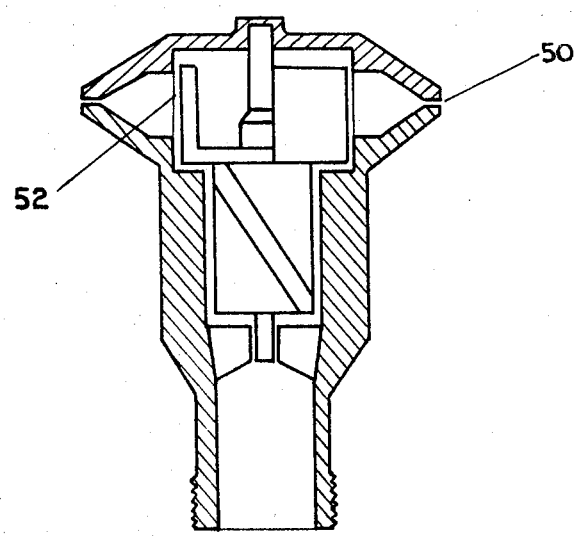

The embodiment shown in FIG. 7 is an adaptation of the instant invention to a single head type sprinkler. The orifices are in the form of narrow slits 50, as shown in fragmentary view of FIG. 5, or a group of holes as shown in fragmentary view of FIG. 6, circumferentially disposed and integral with the valve housing. Each such slot, or each such group of holes is supplied by one output port 52 similar in function to 42 and 43 of FIG. 3.

Figure 5:
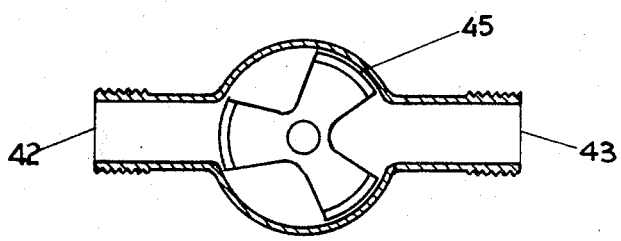
FIG. 5 is a fragmentary top view of the embodiment shown in FIG. 7.

Any number of output ports can be used and the two outputs of FIG. 3 and four outputs of FIGS. 5 and 6 are only representative of an unlimited number of possibilities.

Although a number of perferred and practical forms of valves and orifice designs have been illustrated and described, it will be understood that various modifications may be resorted to without departing from the spirit of the instant invention, for example the blades of the impeller may be varied in number, shape and disposition, and impeller and valve elements may be integrally disposed as described or connected through drive members and gearing means to vary the relative speed between valve means and water velocity; similarly valving elements and output ports can vary as to the number of valves to each set of ports and their relative size and shape, to provide a great many adaptations to specific requirements all within the scope of the instant invention.

I claim:

1. A sprinkler unit for sprinkling, irrigation, and the like, comprising in combination a non-rotating sprinkler head wherein the reach of a jet of water is controlled by varying the pressure of the outlet ports and said variations in pressure being periodically varied from maximum to a substantially zero pressure to reach any distance between said maximum and substantially zero value, means within said non-rotating head for making said variations sufficiently rapid in succession so that a continuity of water fall is achieved at any distance and at any interval of time within said maximum and substantially zero reach, to produce a rapidly oscillating radial sweep, and thereby cause the water stream to break up into a great number of large droplets, said means comprising a supply port opening into a valve housing and a plurality of equally spaced outlet ports disposed circumferentially and directed radially therefrom, a valve body rotatably disposed within said housing, an impeller integral with said valve body and disposed within said supply port and upstream of the water supply and rotated thereby, and having a plurality of valve elements on said valve body within close proximity of said outlet and dimentionally substantially equal in width to the width of the outlet ports, the disposition of valve elements and outlet ports being such that when one outlet port is being progressively opened and adjoining outlet port is progressively closing and therefore half of all the outlet ports is progressively opening while the other half is progressively closing, therefore maintaining a steady flow of water in the supply line conducive to a vibrationless operation.

* * * * *